United States Patent [19]

Venner et al.

[11] Patent Number: 5,122,973
[45] Date of Patent: Jun. 16, 1992

[54] FRONT-END SYSTEM FOR A RASTER OUTPUT SCANNER

[75] Inventors: Cornelis W. Venner, Meijel; Theodorus H. Willems, Horst; Franciscus H. J. Tunnissen; Gerardus G. Kessels, both of Venlo, all of Netherlands

[73] Assignee: OCE Nederland B.V., Netherlands

[21] Appl. No.: 253,261

[22] Filed: Oct. 4, 1988

[30] Foreign Application Priority Data

Oct. 5, 1987 [EP] European Pat. Off. ............ 87201897

[51] Int. Cl.⁵ ................................................ G06F 3/14
[52] U.S. Cl. ................................................... 395/117
[58] Field of Search ............... 364/518, 521, 522, 519; 340/703, 721, 723

[56] References Cited

U.S. PATENT DOCUMENTS

| | | | |
|---|---|---|---|
| 4,342,029 | 7/1982 | Hofmanis et al. | 340/721 X |
| 4,439,759 | 3/1984 | Fleming et al. | 340/723 X |
| 4,439,760 | 3/1984 | Fleming | 340/717 X |
| 4,454,593 | 6/1984 | Fleming et al. | 364/900 |
| 4,564,915 | 1/1986 | Evans et al. | 364/521 |
| 4,722,064 | 1/1988 | Suzuki | 364/518 |

FOREIGN PATENT DOCUMENTS 0227106 1/1987 European Pat. Off. .
2185608 7/1987 United Kingdom .

Primary Examiner—Heather R. Herndon
Attorney, Agent, or Firm—Reed Smith Shaw & McClay

[57] ABSTRACT

The present invention is a front-end system for the conversion of graphical data and coded font data into a serial pixel-bit stream for a raster output scanner, such as a laser printer. The front-end system includes a front-end controller, input/output means, which can be connected to a computer or a data network, and a memory for storing graphical data and coded font datat. Final printing format is determined by a fine formatter. The present front-end system also includes a bitmap memory for storing a bitmap representation of the page to be printed, a bitmap filler for expanding the data and placing them into the bitmap memory, and a bitmap reader. The functions of the front-end controller and of the input/output means are implemented in a first processor and the functions of the fine formatter and the bitmap filler are implemented in a second processor. The bitmap reader is formed by dedicated hardware logic. With the present construction, a high speed page processing can be achieved with a reduced number of processors.

8 Claims, 5 Drawing Sheets

| PAGE NUMBER: | n | n+1 | n+2 |
|---|---|---|---|
| 70 | INPUT PCD | | |
| 72 | FINE FORMATTING | INPUT PCD | |
| 74 | FILL BITMAP | | |
| 76 | ENABLE INT 1 | | |
| 78 (INT 1) | | FINE FORMATTING | INPUT PCD |
| | | DISABLE INT 1 ENABLE INT 2 (SET CLRD), ENABLE BITMAP READER | |
| 80 (INT 2) | READ BITMAP | FINE FORMATTING | |
| | | DISABLE BITMAP READER RESET CLRD | |
| | | FINE FORMATTING | |
| 74 | | FILL BIMAP | |
| 76 | | ENABLE INT 1 | |
| 78 | | | FINE |

FIG.4

FRONT-END SYSTEM FOR A RASTER OUTPUT SCANNER

FIELD OF THE INVENTION

This invention relates to a front-end system for the conversion of graphical data and/or coded font data into a serial pixel-bit stream for a raster output scanner, and, in particular, to a front-end system which includes first and second processors for controlling input and output of graphical and font data for controlling bitmap reading in order to obtain a printed page, and to a method of refreshing data in a dynamic RAM that is used as a page-size bitmap memory in such a front-end system.

BACKGROUND OF THE INVENTION

Front-end systems are used in printers which are able to print a complete page line-wise with serially presented data. A typical representative of this type of printer is a laser printer.

Typically, graphical data is obtained by scanning an image by means of a scanning device and storing that data, with or without the aid of a coding system, in a memory. The data for printing a page are first processed, for example, by a graphical workstation, to produce the desired layout which may contain both textual and graphical data. This data is fed to the front-end system along with information relating to height, width and desired page position.

The front-end receives the data and operating instructions from the workstation or a printer console and are stored in a memory of the front-end system. Information on the shape of fonts and logos may also be fed to the front-end system or permanently stored therein. The exchange of data between the front-end system and peripheral devices is controlled by means of an input/output system which forms part of the front-end system. See, for example, British Application GB-A 2 185 608 and European Application EPA-0227-106.

In general, the input data need further processing in order to determine the exact positions of the fonts and graphical items to be printed. For example, in order to obtain an optimal spacing between the different characters or fonts of a text line, the different shapes and, in particular, the different widths of the fonts have to be considered when determining the exact positions of the fonts. The processes related to these kinds of problems shall be termed "fine formatting" hereinafter.

Subsequent to fine formatting, the data for the page is expanded into a bit representation and placed at the desired position in the page-size bitmap memory. When the bitmap has been filled completely, so that it contains a bit representation of the complete page, the data are read out of the bitmap and are supplied to the raster output scanner in the form of a serial pixel-bit stream.

A conventional front-end system is disclosed in United States application Ser. No. 912,588, filed Sep. 26, 1986, owned by the assignee of this invention and incorporated herein by reference.

In general, the front-end system therein described includes three processing units, i.e., an I/O-processor for controlling the exchange of data with the workstation, the printer console and the like, a main processor for controlling the functions of the individual components of the front-end system and for carrying out the fine formatting process, and a raster image processor for filling and reading the bitmap. A first bus system, e.g., a VME bus, interconnects the I/O-processor, the main processor, the raster image processor and the memory in which the fonts, the coded input data and the like are stored. The communication between the raster image processor and the bitmap is provided by a second bus system.

In this system, the performance capacities of the I/O-processor and the raster image processor are not fully exploited. On the other hand, the main processor is fully used or over utilized resulting in a limited operating speed of the entire front-end system.

Accordingly, it is an object of the present invention to utilize the capacities of the processors more efficiently, so that the operating speed of the front-end system can be increased or the complexity of the hardware reduced.

SUMMARY OF THE INVENTION

Generally, the front-end system according to the present invention includes only two processors. A first processor is provided for controlling the main functions of the front-end system and for controlling the exchange of data with the peripheral devices. For convenience throughout, this processor will be designated as the "front-end system processor" (FSP). The second processor, designated as the "page processing unit" (PPU), includes a central processing unit (CPU) for carrying out the fine formatting process and for filling the bitmap. The bitmap reading process, which has a comparatively low complexity, is not carried out by the CPU, but is implemented in dedicated logic that is associated with second processor, i.e., the page processing unit.

In the present invention the CPU of the page processing unit is not concerned with the bitmap reading process so it can execute the fine formatting process for the subsequent page, while the current page is printed. In this way, both processors are more evenly utilized throughout the printing cycle, so that the overall operating speed is increased, while reducing the number of processors.

In a preferred embodiment the memory, for storing the information on page content and the font shapes is connected to the second bus system. During the bitmap filling process, the second bus system is used for transmitting data to the bitmap. During the bitmap reading process, the second bus system is used for the exchange of data between the memory and the processor, so that the fine formatting process can be readily carried out without any need for accessing the first bus system which is normally being used to control operations.

On the other hand, when input data received from a workstation have to be transmitted to the memory, the CPU of the page processing unit is used as a data transfer relay. Preferably, the page processing unit has a memory controller which operates autonomously from the CPU, so that the data received from the first bus system can be transmitted to the memory without substantially deferring the operation of the CPU.

The bitmap memory is preferably a dynamic RAM. Consequently, it is necessary to periodically refresh the contents of this memory. Normally, it is desirable that the interval between two subsequent refresh cycles is not longer than 8 ms. In view of the fact that the bitmap reader is preferably embodied in dedicated logic, a preferred embodiment of the invention relates to the problem of enabling the bitmap reader to efficiently carrying out the refresh operation.

In summary, the invention involves the addressing of the dynamic RAM memory. The dynamic RAM is conventionally configured like a matrix and is accessed by supplying the row address and the column address of the desired memory location as well as respective strobe signals. At first, the row address is supplied to the memory. Upon a row address strobe signal (RAS) the row address is loaded into the row address register of the memory and decoded in order to select the desired row of the memory array. The contents of this row are destructively read into a buffer. Then, the column address is supplied and loaded into the column address register in response to a column address strobe (CAS), in order to read the contents of the selected memory location from the buffer or to write the new data into the buffer. Finally, the contents of the buffer are transferred back to the row of the memory array. As will be understood from the above, in a read cycle or a write cycle, the row address strobe must be supplied prior to the column address strobe (RAS before CAS).

However, commercially available dynamic RAMs have a so called "CAS before RAS refresh" function. If, in such a dynamic RAM, the column address strobe is supplied prior to the row address strobe, the control logic of the memory disregards the row and column addresses supplied thereto and carries out a refresh cycle, instead. The address of the row to be refreshed is taken from an internal address counter, the contents of which are increased by one after each refresh cycle.

Data required to be read from the dynamic RAM in a continuous bit-stream, necessitates a periodical interruption in order to perform the refresh cycles. It is theoretically possible to write and read the data column-wise, so that the rows of the memory array are accessed in short intervals. The rows of the memory are refreshed in the course of the normal read or write accesses, so that additional CAS before RAS refreshes may be dispensed with. However, processors that are practically well suited for serving as a page processing unit in a front-end system according to the invention generate multiplexed row and column addresses in such a manner that the data are written into the dynamic RAM row-by-row. Accordingly, in order to fully exploit the capabilities of such a processor, the memory array is filled linewise which requires, the reading process to also be carried out linewise, with additional CAS before RAS refresh cycles being executed.

The present invention overcomes these problems by dividing the dynamic RAM into two separate interleaved banks. This means that the two banks are alternately accessed during the reading process. Consequently, a refresh may be carried out in the second bank while the data are read from the first bank, and vice versa.

Thus, the row address strobe for one bank is delivered to the other bank as a column address strobe, while the column address strobe for the first bank is delivered to the second bank as a row address strobe.

Thus, whenever data are read from one of the banks, the other bank is automatically caused to perform a refresh cycle. Accordingly, the control process is greatly simplified and can easily be implemented in a dedicated logic. Other advantages of the invention will become apparent from detailed description of a presently preferred embodiment of the invention taken in connection with the accompanying drawings.

BRIEF DESCRIPTION OF THE DRAWINGS

FIG. 4 is a time table illustrating the operation of a page processing unit;

PRESENTLY PREFERRED EMBODIMENT OF THE INVENTION

Figure 1:
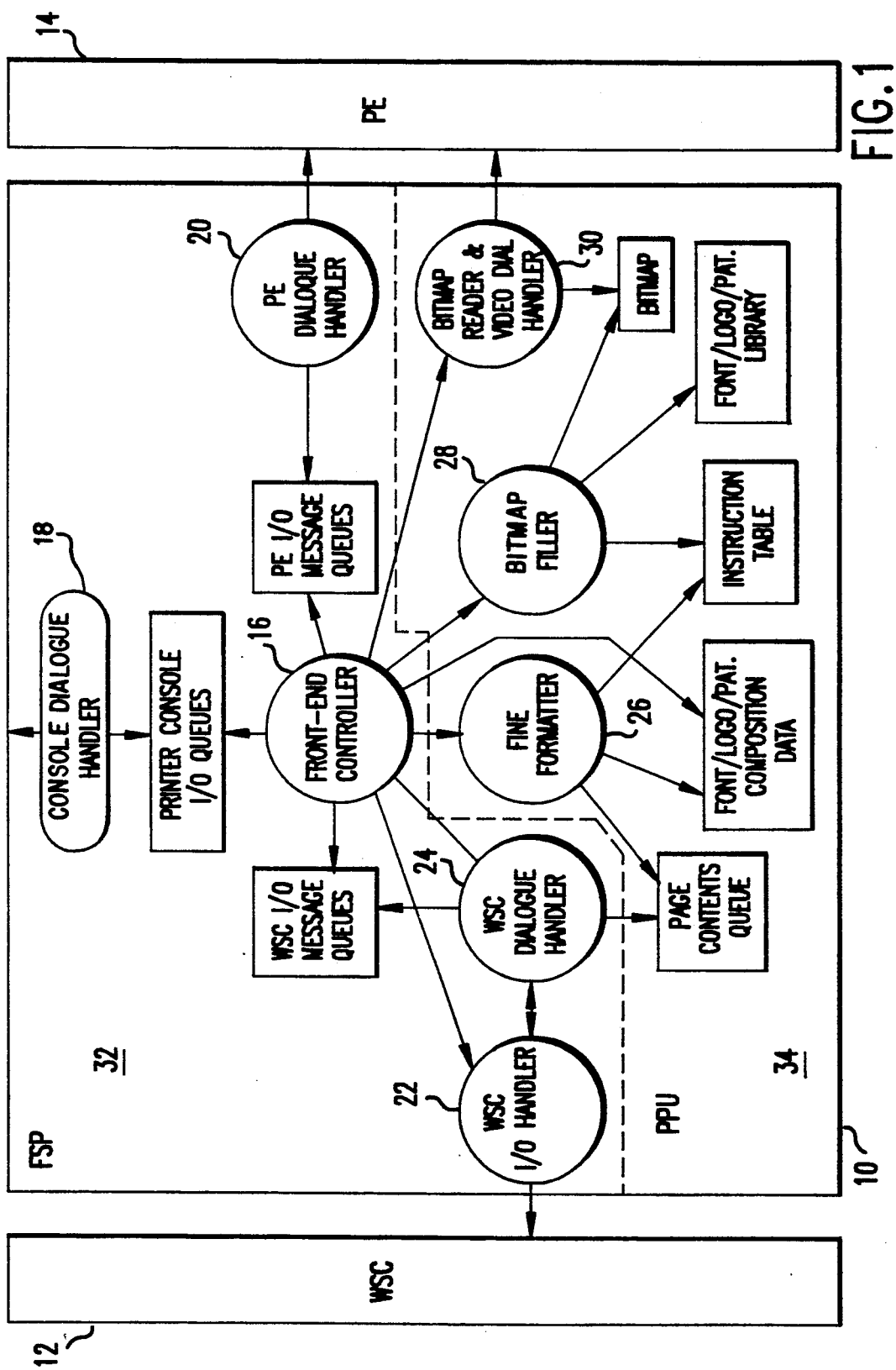
FIG. 1 is a schematic diagram illustrating the functional structure of a front-end system according to the invention.

Referring to FIG. 1, a front-end system 10 intervening between a workstation controller (WSC) 12 of a graphical workstation, a text processing system or the like and a raster output scanner 14 such as a printer engine (PE) of a laser printer.

A conventional front-end system 10 may be assumed to include the following main functional units:

a. a front-end controller 16 for controlling the function of the individual components of the front-end system;

b. a console dialogue handler 18 providing communication between the front-end system 10 and a printer console (not shown);

c. a PE dialogue handler 20 for providing communication between the front-end system and the printer engine;

d. a WSC I/O-handler 22 and a WSC dialogue handler 24 for controlling the exchange of data and instructions between the front-end system and the workstation controller 12;

e. a fine formatter 26 for determining the final format of the contents of a page to be printed;

f. a bitmap filler 28 for creating a bitmap representation of the image data of the page to be printed in a bitmap memory; and g. a bitmap reader and video dialogue handler 30 for transmitting the contents of the bitmap memory to the raster output scanner 14 in the form of a serial pixel bit-stream in synchronism with the operation of the scanner.

The front-end controller 16 exchanges message queues with the console dialogue handler 18, the PE dialogue handler 20 and the WSC dialogue handler 24 and sends commands to the individual components of the front-end system in response to instructions and messages received from the dialogue handler, in order to control and synchronize the various processes that are executed concurrently in front-end system 10.

The fine formatter 26 has access to page contents data inputted from workstation control 12 via the WSC dialogue handler. On the basis of these page contents data and on the basis of composition data of the fonts, logos or patterns to be printed, the fine formatter creates an instruction table for assembling the page to be printed. The information on the shape of the fonts, logos or pattern is preferably stored in a library in the form of character bitmaps. The bitmap filler 28 fetches these character bitmaps from the library and assembles them to the page-size bitmap in accordance with the instructions from the instruction table. When the page-size bitmap is completed and a signal from the printer engine indicates that the printer is ready to print out a new page, the data are transmitted from the bitmap to the printer engine by means of the bitmap reader 30.

As is shown in FIG. 1, the functions of the front-end system 10 of the present invention are executed in two processing units 32 and 34. First processing unit 32, front-end system processor (FSP), performs the functions of the front-end controller 16, the WSC I/O-handler 22 and the dialogue handlers 18, 20 and 24. The second processing unite 34, the page processing unit (PPU), performs the functions of fine formatter 26, bitmap filler 28, and bitmap reader 30.

Figure 2:
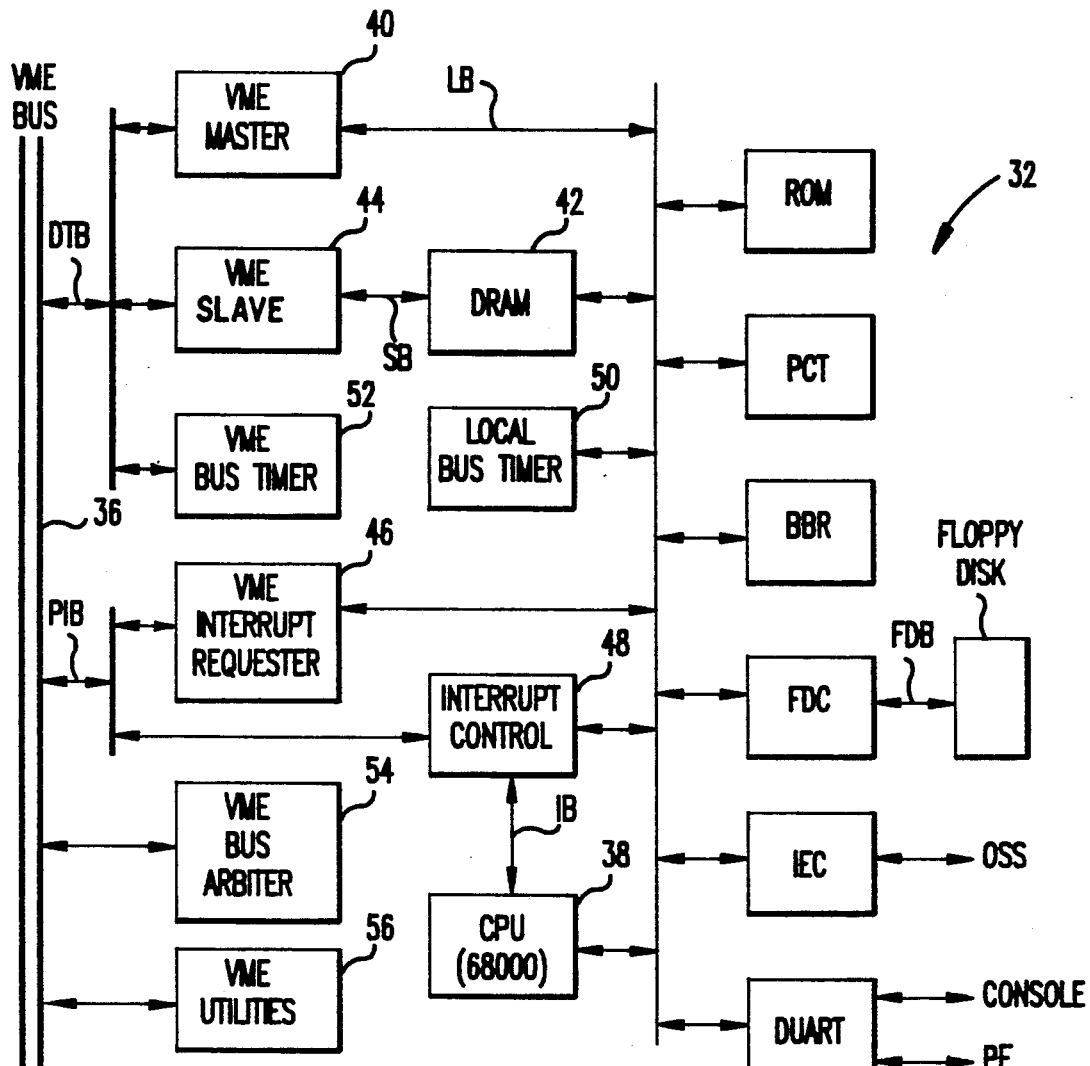
FIGS. 2 and 3 are block diagrams of two major components of the front-end system.
Figure 3:
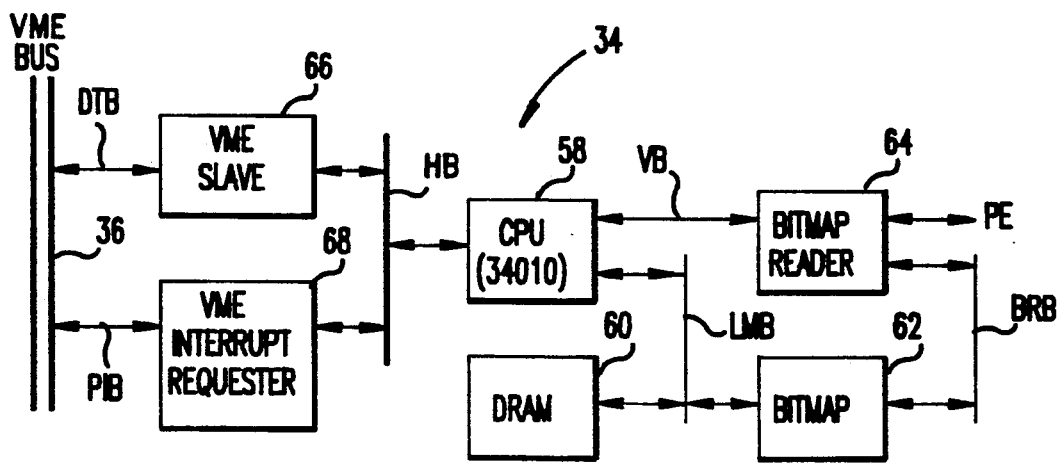

The hardware components of the front-end system processor 32 and the page processing unit 34 are shown in FIGS. 2 and 3, respectively. The processing unites 32 and 34 communicate with each other via a VME bus 36. See, for example, Mackenna et al. Backup support gives VME bus powerful multiprocessing architecture. Electronic Components and Applications, Vol. 6, No. 3 (1984) pp. 178-185.

The front-end system processor 32 includes a CPU 38 which is connected to other components of the processing unit by means of a local bus LB. The other components connected to the local bus may comprise a storage means, for example, a floppy disk controller FDC connected to a floppy disk via a floppy disk bus FDB, a ROM containing boot-up software, a programmable counter/timer PCT containing an initialization register which can be programmed by CPU 38, a battery backup memory BBR (RAM) for saving service information, an IEEE-488 interface controller IEC for receiving data from an input device, such as an optical scanning system or a workstation, or the like, and a dual asynchronous receiver/transmitter DUART serving as an interface between CPU 38 and serial interfaces for the printer console and the printer engine.

CPU 38 has access to the VME bus via the local bus LB, a VME master 40 and a data transfer bus DTB. A dual-ported dynamic RAM (DRAM) 42 is connected to the local bus, on the one hand, and to a VME slave 44 via a slave bus SB, on the other hand. The DRAM 42 is used for the local storage of the program code for CPU 38, data structures and the like. The DRAM may be accessed by any VME master connected to the VME bus 36, and accesses via the VME bus have a higher priority than accesses from the CPU 38.

The CPU can perform interrupts on the VME bus 36 by means of a VME interrupt requester 46. The CPU can handle interrupts from the VME bus by means of the interrupt control block 48. Both are connected to the local bus, on the one hand, and to the VME bus via a priority interrupt bus PIB, on the other hand. The interrupt control block 48 is directly connected to the CPU 38 by an interrupt bus IB.

The front-end system processor 32 further includes a local bus timer 50 for monitoring the local bus, a VEM bus timer 52, a VME bus arbiter 54 and a VME utilities block 56.

The page processing unit 34 has CPU 58 which is preferably a reduced instruction set processor (RISC) which supports a plurality of graphic operations, for example a 34010 processor manufactured by Texas Instruments. CPU 58 performs the fine formatting process and the bitmap filling process. As these two tasks have to be performed during different time intervals, a multi-tasking operating system is not required.

Page processing unit 34 further includes a local memory consisting of a dynamic RAM (DRAM) 60 and a bitmap memory 62, and a bitmap reader 64 which is preferably dedicated hardware logic such as programmable integrated circuits, as described in more detail below. CPU 58 is connected to DRAM 60 and bitmap memory (or briefly: bitmap 62) by means of a local memory bus LMB and to the bitmap reader by means of a video bus VB. Bitmap reader 64 is connected to bitmap 62 by means of a bitmap reader bus BRB and is connected to the printer engine by means of a printer engine bus (PE).

A host bus HB connects CPU 58 to a VME slave 66 and a VME interrupt requester 68 which are connected to the VME bus via a data transfer bus DTB and a priority interrupt bus PIB, respectively.

DRAM 60 is used for storing the code, the page contents data, the font, logo and pattern composition data, the instruction table and the font, logo and pattern library mentioned in connection with FIG. 1. The transfer of data, e.g., new page contents data, from the front-end system processor 32 to local memory 60 is achieved by means of VME bus 36, VME slave 66 and CPU 58. CPU 58 is equipped with an autonomous memory controller which performs bit alignment and masking necessary to access data located at arbitrary bit boundaries in the local memory. The memory controller is capable of completing a write cycle without necessarily delaying the execution of subsequent instructions by CPU 58. Only when another memory operation is required before the memory controller has completed the write cycle, the execution of the next instruction is deferred. Thus, CPU 58 can be used as a "window" for transmitting data from the VME bus to DRAM 60 in-between the current fine formatting or bitmap filling operation of CPU, without absorbing too much of the operating time of the CPU.

Optionally, the storage capacity of the DRAM 60 may be enhanced by utilizing a portion of bitmap memory 62, namely that portion which is not used for the bitmap proper, for storing a part of the font library or the like. However, in such a case these data cannot be accessed during the bitmap reading process.

Furthermore, it is possible to store bitmap representations of fonts which are not used very often in a storage means such as a floppy disk of the front-end system processor 32. If it is necessary to retrieve these data, CPU 58 generates a VME interrupt and causes the front-end system processor to transmit the required data.

OPERATION OF PAGE PROCESSOR UNIT 34

The sequence of operating steps of page processing unit 34 described in detail below and is illustrated in FIG. 4.

In step 70, the page contents data (PCD) for a given page (n) are loaded into DRAM 60. Then, the fine formatting process for these data is carried out in step 72. Simultaneously, the page contents data for the next page (n+1) may be transferred to DRAM 60. When the local memory bus LMB is not busy with transmitting page contents data, this bus is used for reading and storing data in connection with the fine formatting process.

When the fine formatting process is completed, the bitmap is filled with the bit representation of the complete page n in step 74. At the end of the bitmap filling process, video registers of CPU 58 are loaded with data indicating the size, i.e., the number of rows and columns, of the bitmap, and an interrupt INT 1 is enabled in step 76.

In subsequent step 78, CPU 58 starts the fine formatting process for the next page (n+1).

When a signal from raster output scanner 14 indicates that the printer engine is ready for printing page n, interrupt INT 1 is supplied to CPU 58. In the interrupt service routine, interrupt INT 1 is disabled and a second interrupt INT 2 is enabled. Depending on a user instruction, a signal CLRD (clear read) may be set in order to indicate that the contents of the bitmap shall be erased concurrently with the reading process. If the signal CLRD is not set, the contents of the bitmap are maintained, so that the same page may be printed out repeatedly. Finally, the bitmap reader is activated.

In step 80, the bitmap reading process is carried out by bitmap reader 64, and the image data are transmitted to the printer engine, while CPU 58 resumes the fine formatting process. During this step, bitmap memory 62 is disconnected from the local memory bus LMB, so that it can only be accessed by bitmap reader 64. The refreshing of the dynamic RAM constituting bitmap memory 62 is also taken over by bitmap reader 64.

When the bitmap reading process is completed, CPU 58 receives second interrupt INT 2. Upon this interrupt, the bitmap reader is disabled, so that bitmap memory 62 can again be accessed and refreshed by CPU 58. The signal CLRD is reset.

If the fine formatting process has not been completed before receipt of interrupt INT 2, this process is resumed after the interrupt service routine has been executed. Then, steps 74 et seq. are repeated for the pages n+1 and n+2.

It should be noted that the bitmap reading process for one page (n) and the fine formatting process for the next page (n+1) are executed concurrently. This is possible because the bitmap reading process is not supported by CPU 58 but implemented in programmable integrated circuits constituting bitmap reader 64.

Figure 5:
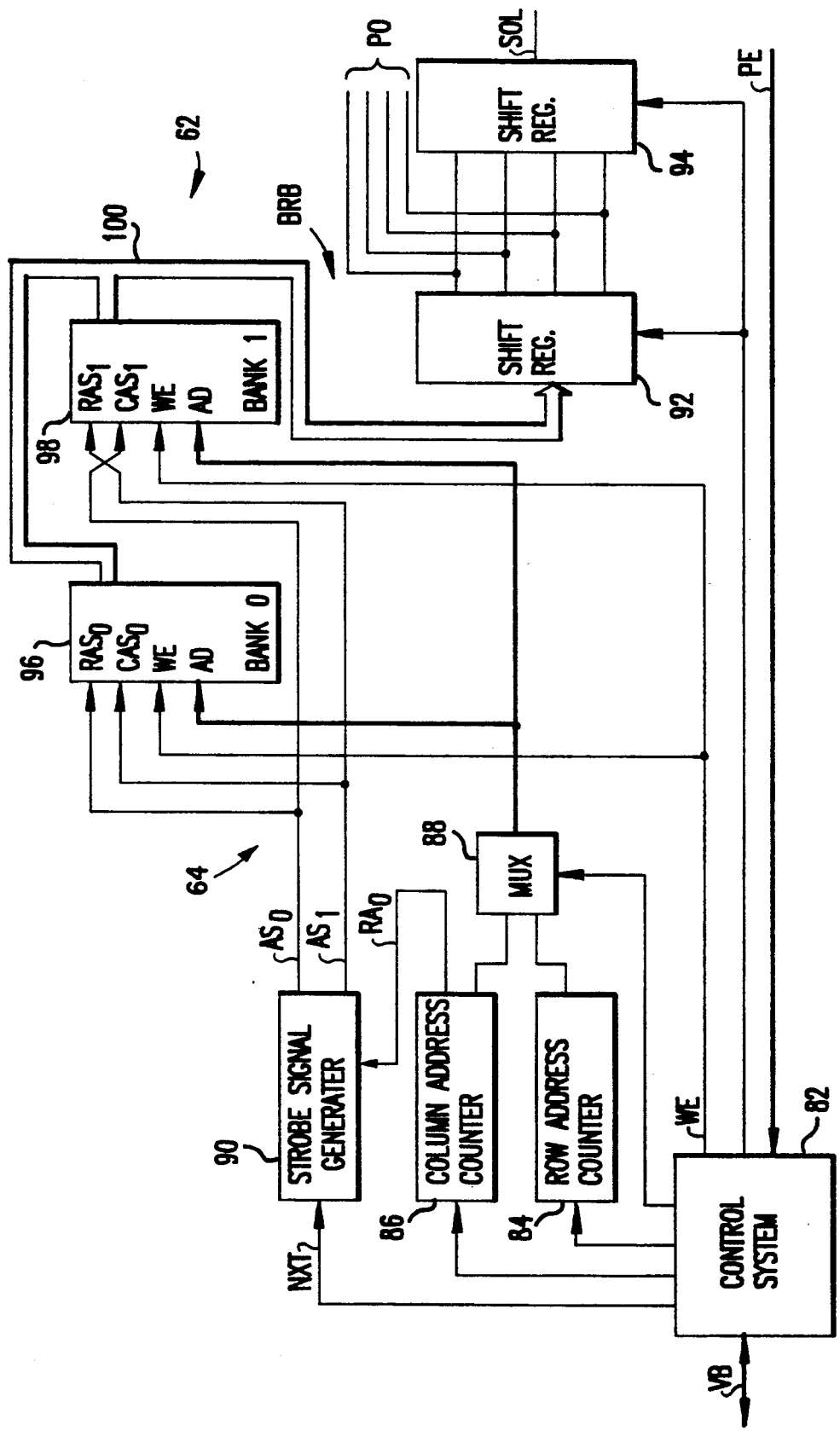
FIG. 5 is a block diagram of a bitmap memory and a bitmap reader.

BITMAP READER OPERATION:

The function of the bitmap reader 64 will be explained below with reference to FIGS. 5 and 6.

Bitmap reader 64 preferably comprises a control system 82, a column address counter 86, a row address counter 84, a multiplexer 88, a strobe signal generator 90, and shift registers 92 and 94. Bitmap memory 62 is divided into first and second banks 96 and 98, respectively.

Control system 82 is connected to CPU 58 by means of video bus VB and to the printer engine by means of the printer engine bus PE and is operative to synchronize the function of the bitmap reader with that of the raster output scanner. During the scan proc®ss, sixteen bit words are read from the bitmap m®mory 62 and are transformed into a serial bit stream which is transmitted to the printer engine through a serial output line SOL. Alternatively, the image data retrieved from bitmap memory 62 may be transmitted through a four-bit parallel output PO.

Whenever a new 16 bit word is to be read from the bitmap memory, the column address counter is increased by one, and a signal NXT is sent to strobe signal generator 90. When the maximum column address is reached, the column address counter is reset and the row address counter is increased by one. The maximum values of the row address counter and the column address counter are determined from the contents of the video register of CPU 58, which have been transmitted to the control system via the video bus.

The least significant bit $RA_O$ of the column address is transmitted to the strobe signal generator. The more significant bits of the column address and the row address are time-multiplexed in multiplexer 88 and transmitted to address ports AD of memory banks 96 and 98.

In response to the bit $RA_O$ and to the signal NXT, the strobe signal generator 90 generates two strobe signals $AS_O$ and $AS_1$.

Figure 6:
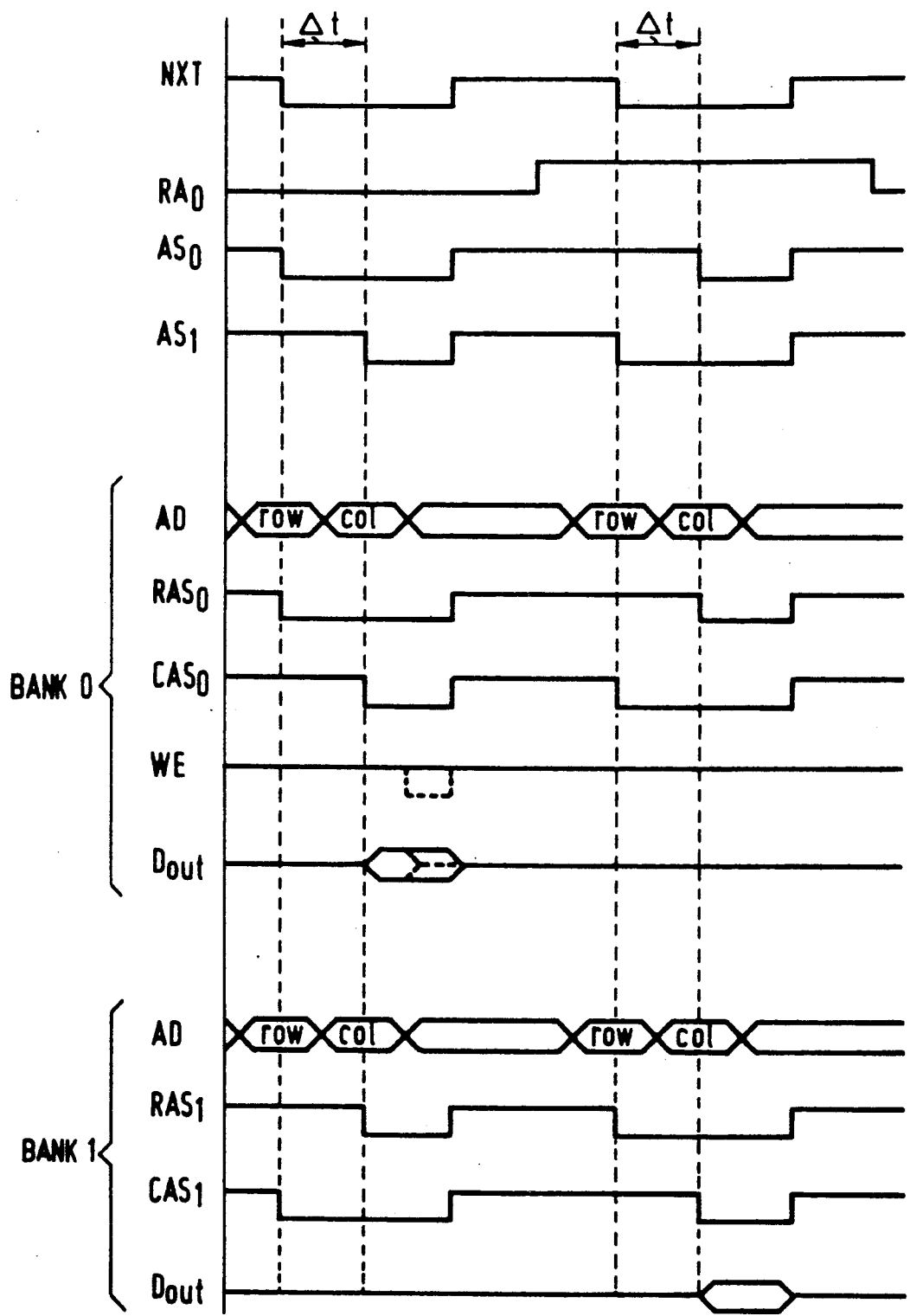
FIG. 6 is a graphic representation of different signals occurring in the bitmap memory and the bitmap reader.

The wave forms of the signals NXT, $RA_O$, $AS_O$ and $AS_1$ are shown in FIG. 6 assuming that the signals are active in the logic "L" state. The strobe signals $AS_O$, $AS_1$ are triggered by the signal NXT. However, depending on the state of the address bit $RA_O$, either the signal $AS_O$ or the signal $AS_1$ becomes active with a certain time delay $\Delta t$.

The row address strobes and column address strobes for first and second memory banks 96 and 98 are derived from strobe signals $AS_O$ and $AS_1$. In first bank 96 (bank O) the row address strobe RASO corresponds directly to $AS_O$, and the column address strobe $CAS_O$ corresponds directly to $AS_1$. However, for second bank 98 (bank 1) the strobe signals $AS_O$ and $AS_1$ are crossed-over, so that $RAS_1$ corresponds to $AS_1$ and $CAS_1$ corresponds to $AS_O$.

In the dynamic RAMs constituting the banks 96 and 98, a read cycle is carried out if the RAS becomes active before the CAS and a write enable signal WE remains inactive. If the order of the row and column address strobes is reversed (CAS before RAS), the corresponding bank is commanded to execute a refresh cycle.

As is shown in FIG. 6, bank 0 receives a RAS before CAS strobe in the first cycle of the signal NXT, so that the sixteen bit word stored at the memory location indicated by the row and column addresses is read from the memory and transferred to the output lines Dout Concurrently, the bank 1 receives a CAS before RAS strobe, so that no read cycle is carried out and a refresh cycle is executed, instead. During the refresh cycle, the output lines $D_{out}$ remain floating.

In the next cycle of the signal NXT, the bank O performs a CAS before RAS refresh while data are read from the bank 1. In the subsequent cycle (not shown in FIG. 6), the first cycle will be repeated with the column address being increased by one.

In this way, the bitmap is read linewise with bank-interleaving, just as it had been filled by CPU 58, and refresh cycles are carried out at sufficiently short intervals. Consequently, if desired, the contents of bitmap memory 62 can be securely maintained. Although the bitmap memory is disconnected from CPU 58, no complex hardware or software is required for controlling the refresh cycles during the bitmap reading process.

During the bitmap reading process, the data input lines of the bitmap memory are locked in the inactive (logic "H") state by means of pull-up resistors. If it is desired to clear the bitmap simultaneously with the read cycle, control system 82 receives the signal CLRD via the video bus VB. In this case, the write enable signal WE is periodically activated during the last part of the column address strobe signal. Consequently, a read-modify-write cycle is carried out instead of a read cycle, and after the old data have been read, a logic "H" is written into the corresponding bitmap location.

The output buffers of first and second banks 96 and 98 of bitmap memory are connected to a common 16-bit parallel bus 100 which forms part of the bitmap reader bus BRB and transmits the output data to shift register 92. As the output lines of the bank executing the refresh cycle are floating, bus 100 carries the data outputted from the bank on which the read cycle is performed.

In response to a control signal from control system 82, the data from the bus 100 are loaded into shift register 92 in the following bit-order: 0-4-8-12-1-5-..... Shift register 92 has four output lines. In the first shift cycle, these output lines carry the bits 0 to 3 which are transmitted to the parallel output PO and are simultaneously transformed into a serial bit-stream by means of shift register 94. In the subsequent shift cycles of the shift register 92, the four-bit words consisting of bits 4 to 7, 8 to 11 and 12 to 15, respectively, are sequentially transmitted to shift register 94. Meanwhile, the next 16-bit word is read from bitmap memory 62 and supplied to shift register 92. In this way, a continuous pixel-bit stream is generated on the serial output line SOL and is transmitted to the raster output scanner.

The front-end system with the above-described construction is capable of high speed page processing. In a practical embodiment, it is possible to process up to 53 A4-pages per minute with a resolution of 118 dots/cm (300 dots/inch).

While a presently preferred embodiment of the invention has been shown and described in particularity, it may be otherwise embodied within the scope of the appended claims.

What is claimed is:

1. A front-end system for conversion of graphical data and coded font data into a serial pixel-bit stream for a raster output scanner to obtain a printed page, comprising:
    a front-end control means for controlling said front-end system,
    an input/output means which can be connected to either one of a computer of a data network,
    a memory means for storage of said graphical data and said coded font data, supplied via said input-/output means, for a page to be assembled,
    a fine formatting means for determining a format of the fonts and graphical items to be printed,
    a bitmap memory for storage of a bit representation of a complete page to be printed,
    a raster image processing means for expanding data for a page to be assembled and placing of said bit representation thereof in said bitmap memory, and
    a bitmap reading means for conversion of said stored bit representation of the page to be printed into a serial pixel-bit stream for supply to a raster output scanner,
said front-end control means, said input/output means and said raster image processing means including a plurality of processor units communicating with each other via a first bus system and with said bitmap memory via a second bus system, said front-end control means and said input/output means being implemented in a first processor, said fine formatting and said raster image processing means being implemented in a second processor, and said bitmap reading means being implemented in a dedicated hardware logic which is activated and deactivated by said second processor.

2. The front-end system according to claim 1, wherein said memory means is associated with said second processor and said seoncd processor includes a central processing unit connected to said memory means by means of said second bus system, said central processing unit serving as a relay for exchanging data between said first processor and said memory means.

3. The front-end system according to claim 2, wherein said processor comprises a memory controller which is autonomous of said central processing unit and is adapted to maintain and complete an access cycle on said memory means while other instruction steps are executed in said central processing unit.

4. The front-end system according to claims 1, 2 or 3 wherein said central processing unit of said second processor is a reduced-instruction-set microprocessor.

5. The front-end system according to claim 1, 2 or 3 wherein said bitmap reading means comprises programmable logic circuits.

6. A method of converting graphical data and coded font data into a serial pixel-bit stream in a front-end system according to claims 1, 2 or 3, wherein a fine formatting process and bitmap filling process, in which the bit representation of the page to be printed is placed in said bitmap memory, are carried out alternately such that said fine formatting process for a given page (n+1) starts when said bitmap reading means have been activated for printing-out the preceding page (n), and the bitmap filling process for the given page (n+1) starts when the read-out process for the proceding page is finished.

7. A method according to claim 6, wherein said graphical and coded font data are transmitted from said first processor to said memory means via said first bus system, said central processing unit of said second processor and said second bus system, and the access on the second bus system is time-shared between the data transmission process and said fine formatting or bitmap filling process.

8. A method of refreshing and accessing data in a dynamic RAM (Random access memory) used in a bitmap memory of a front-end system for the conversion of graphical data and coded font data into a serial pixel-bit stream for a raster output scanner to obtain a printed page, said bitmap memory comprising two banks, each of said banks comprising at least one dynamic RAM array adapted to perform CAS-(column address strobe)-before-RAS(row address strobe) refresh cycles, said bitmap reading means comprising a row address counter, a column address counter and a multiplexer for supplying multiplexed row and column addresses to both of said banks of said bitmap memory, and a strobe signal generator having two outputs ($AS_0$, $AS_1$) for delivering row address strobes and column address strobes, the order of the row and column address strobes being periodically inverted in response to the state of the least significant bit of said column address counter, and wherein the row address strobe port of said first bank and the column address strobe port of said second bank are connected to a first output of said strobe signal generator, while said column address strobe port of said first bank and said row address strobe port of said second bank are connected to a second output of said strobe signal generator, further wherein said dynamic RAM comprises two banks of matrix-like memory arrays in which the data are stored linewise with interleaving of said two banks, and wherein an access cycle for a bank is commanded by supplying a row address strobe prior to a column address strobe while a refresh cycle is commanded by supplying said column address strobe prior to said row address strobe, and wherein said row address strobe for one bank is supplied to said other bank as a column address strobe and said column address strobe for said one bank is supplied to said other bank as a row address strobe.

* * * * *